US008886029B2

(12) United States Patent
Kawasaki et al.

(10) Patent No.: US 8,886,029 B2
(45) Date of Patent: Nov. 11, 2014

(54) 3-D IMAGE PICKUP APPARATUS

(75) Inventors: Aiichiro Kawasaki, Kanagawa (JP); Tetsuro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 536 days.

(21) Appl. No.: 13/224,396

(22) Filed: Sep. 2, 2011

(65) Prior Publication Data
US 2012/0062704 A1    Mar. 15, 2012

(30) Foreign Application Priority Data
Sep. 9, 2010  (JP) ............................... P2010-201942
Mar. 29, 2011  (JP) ............................... P2011-071825

(51) Int. Cl.
| G05G 1/10 | (2006.01) |
| G03B 35/00 | (2006.01) |
| H04N 13/02 | (2006.01) |
| G03B 35/10 | (2006.01) |

(52) U.S. Cl.
CPC ....... *H04N 13/0239* (2013.01); *H04N 13/0296* (2013.01); *G03B 35/10* (2013.01); *H04N 2213/001* (2013.01)
USPC .......................................... 396/324; 74/553

(58) Field of Classification Search
CPC ......................................................... G05G 1/10
USPC ....................... 396/322; 74/504, 553; 359/375
See application file for complete search history.

(56) References Cited

U.S. PATENT DOCUMENTS

| 5,648,871 | A | * | 7/1997 | Okuyama et al. ............. 359/557 |
| 5,682,198 | A |   | 10/1997 | Katayama et al. |
| 5,778,268 | A | * | 7/1998 | Inaba ............................. 396/326 |
| 5,999,312 | A | * | 12/1999 | Funatsu ........................ 359/407 |
| 6,512,892 | B1 | * | 1/2003 | Montgomery et al. ........ 396/326 |
| 7,190,389 | B1 |   | 3/2007 | Abe et al. |
| 2006/0066822 | A1 | * | 3/2006 | Salvatori et al. .............. 353/102 |

FOREIGN PATENT DOCUMENTS

| EP | 1 085 769 | 3/2001 |
| GB | 2 168 565 | 6/1986 |

OTHER PUBLICATIONS

Minoru Namikawa, "Panasonic Integrated Twin-lens 3D Camera Recorder", System Business Group, Panasonic AVC Networks Company. Video Alpha, Jul. 2010, pp. 45-50.

* cited by examiner

*Primary Examiner* — Clayton E Laballe
*Assistant Examiner* — Noam Reisner
(74) *Attorney, Agent, or Firm* — Wolf, Greenfield & Sacks, P.C.

(57) ABSTRACT

A 3-D image pickup apparatus includes a lens portion that includes a lens system; and an adjustment ring portion that includes plural coaxially rotatable rings. Each ring adjusts a respective one of plural optical parameters of the lens system.

13 Claims, 18 Drawing Sheets

Zoom adjustment

Focus adjustment

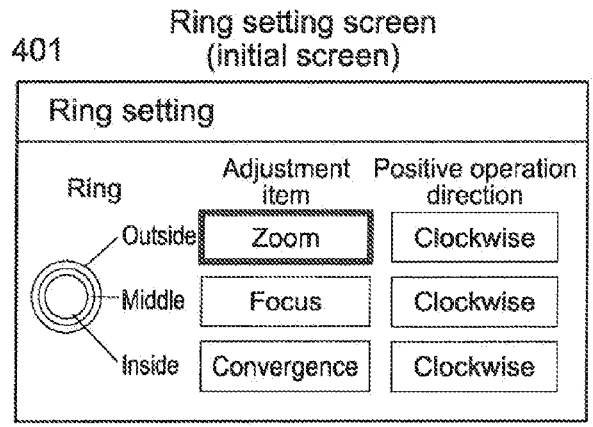
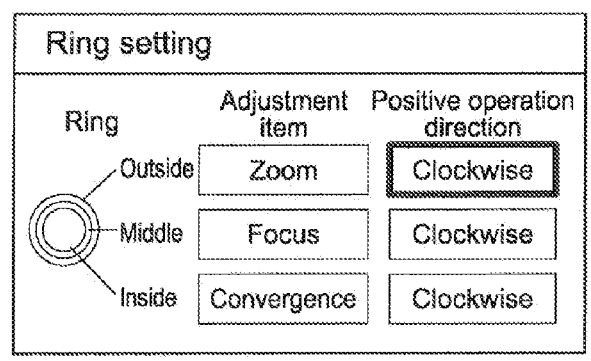
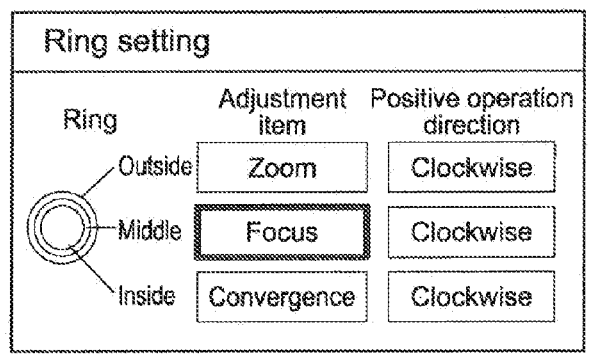
FIG.16

404

Ring setting

| Ring | Adjustment item | Positive operation direction |
|---|---|---|
| Outside | Zoom | Clockwise |
| Middle | Convergence | Clockwise |
| Inside | Convergence | Clockwise |

⬇ Rotational operation of rotary switch

405

Ring setting

| Ring | Adjustment item | Positive operation direction |
|---|---|---|
| Outside | Zoom | Clockwise |
| Middle | Convergence | Clockwise |
| Inside | Convergence | Clockwise |

⬇ Push operation of rotary switch

406

Ring setting

| Ring | Adjustment item | Positive operation direction |
|---|---|---|
| Outside | Zoom | Clockwise |
| Middle |  | Counterclockwise |
| Inside | Convergence | Clockwise |

FIG.17

3-D IMAGE PICKUP APPARATUS

CROSS REFERENCE TO RELATED APPLICATIONS

The present application claims priority under 35 U.S.C. §119 to Japanese Patent Application No. JP 2010-201942, filed in the Japan Patent Office on Sep. 9, 2010, and Japanese Patent Application No. JP 2011-071825 filed in the Japan Patent Office on Mar. 29, 2011, the entire contents of which are incorporated herein by reference.

BACKGROUND

The present disclosure relates to a twin-lens 3-D image pickup apparatus.

From the past, an image pickup system that picks up a 3-D video has been structured by combining two existing image pickup apparatuses. For example, for reproducing a binocular disparity there is a method of attaching two image pickup apparatuses to a frame (rig) in combination with a half mirror to thus pick up, an image. Nowadays, there is also known an apparatus that is capable of picking up a 3-D video as a single image pickup apparatus (see, for example, "Monthly Video a (July, 2010)" p. 45 to p. 50, Shashinkogyo Corporation; hereinafter, referred to as Non-patent Document 1). According to Non-patent Document 1, two lenses are provided in a single image pickup apparatus, and a 3-D image is taken using the two lenses.

Incidentally, for taking a 2D video with an image pickup apparatus; focus/zoom/iris adjustments are required. When taking a 3-D video, a convergence adjustment is additionally required. Here, the convergence is related to an adjustment of a stereoscopic effect of a 3-D video and expressed by a positional relationship between a convergence point as a point at which optical axes of two lenses intersect and an object. For example, a 3-D video is displayed such that an object located on a rear side of a convergence point with respect to a lens appears to be set back and an object located in front of the convergence point with respect the lens appears to be protruding. An adjustment of a distance of the convergence point is made by varying a tilt of the two lenses with respect to optical axes and adjusting a convergence angle.

SUMMARY

For example, when the positions of the two lenses in a direction along the optical axes are changed for a focus adjustment while an image is being taken, the convergence point moves in a front direction or a depth direction along with the movement of the lenses. For bringing back the moved convergence point to the position before the focus change, it may be necessary to change a tilt of the lenses with respect to the optical axes. Conversely, when the convergence point is moved, it may be necessary to perform a focus adjustment as a result. As described above, for taking a desired 3-D video, it is favorable to perform fine adjustments on the focus and convergence, and the focus adjustment and the convergence adjustment are carried out alternately and repetitively in many cases.

In the image pickup apparatus disclosed in Non-patent Document 1, however, there is a fear that, since a dial for adjusting a convergence is provided at a position distant from a mechanism for adjusting a focus, a user operation in repeating fine adjustments on the focus and convergence may become complex.

In view of the circumstances as described above, there is a need for a twin-lens 3-D image pickup apparatus that is capable of carrying out fine adjustments on a focus and convergence with favorable operability.

According to one embodiment, the present disclosure is directed to a lens apparatus that includes a lens system; and an adjustment ring portion that includes plural coaxially rotatable rings, each adjusting a respective one of plural optical parameters of the lens system.

According to another embodiment, the lens apparatus is included in a 3-D image pickup apparatus.

BRIEF DESCRIPTION OF DRAWINGS

FIG. 16 is a diagram showing a ring setting GUI and display transitions thereof in the 3-D image pickup apparatus of the second embodiment;

FIG. 17 is a diagram showing the ring setting GUI and display transitions thereof as in FIG. 16;

DETAILED DESCRIPTION OF EMBODIMENTS

Hereinafter, embodiments of the present disclosure will be described with reference to the drawings.

First Embodiment

A first embodiment is a twin-lens 3-D image pickup apparatus that is capable of taking a 3-D video by photographing the same object from a plurality of observing points. The twin-lens 3-D image pickup apparatus converts left- and right-side images of an object taken in via left- and right-side lenses into electric signals using an image pickup device, subjects the electric signals to an A/D conversion, compression-codes the signals by a predetermined method such as an HDV (High-Definition Video) method, and records them onto left- and right-side semiconductor recording media. As the image pickup device, a CCD (Charge Coupled Device), a CMOS (Complementary Metal Oxide Semiconductor), or the like is used.

The 3-D image pickup apparatus is equipped with an adjustment ring constituted of three rings that are used for adjusting a zoom, focus, and convergence, the three rings being combined coaxially and being independently rotatable. Especially the two adjustments of a focus and convergence out of the adjustments of a zoom, focus, and convergence mutually affect the adjustment of the other one when adjusted. Thus, the two adjustments are repeated alternately in many cases. Since the adjustments can be made by operating a focus adjustment ring and a convergence adjustment ring provided coaxially and rotatably in the adjustment ring in the 3-D image pickup apparatus of this embodiment, an improvement in adjustment efficiency can be expected.

In descriptions below, the first embodiment of the 3-D image pickup apparatus will be specifically described.

(Structure of 3-D Image Pickup Apparatus)

Figure 1:
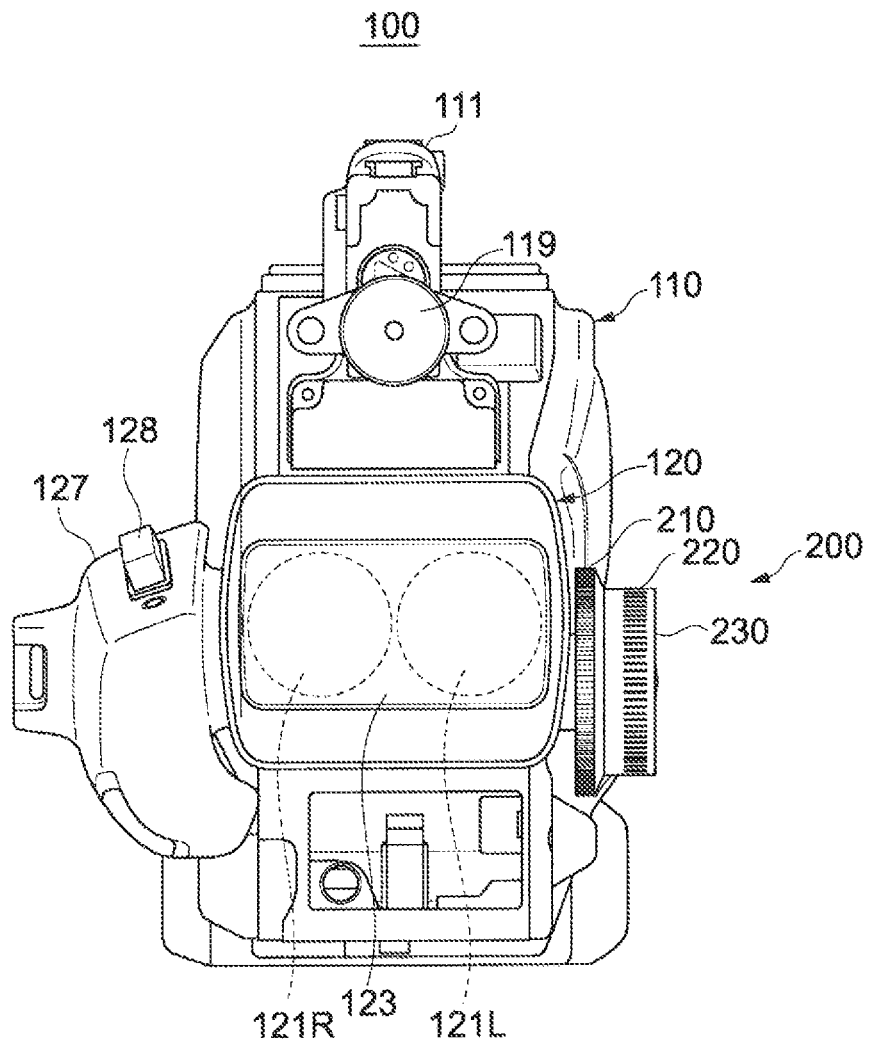
FIG. 1 is a front view of a 3-D image pickup apparatus according to an embodiment of the present disclosure.
Figure 2:
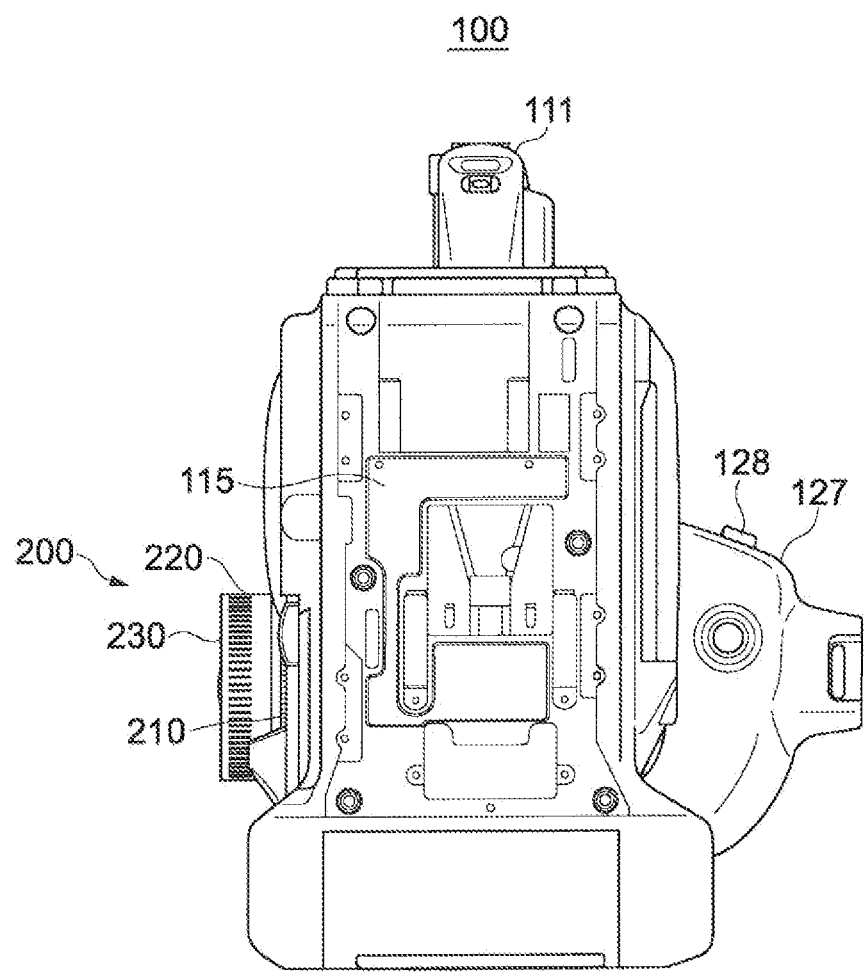
FIG. 2 is a back view of the 3-D image pickup apparatus shown in FIG. 1.
Figure 3:
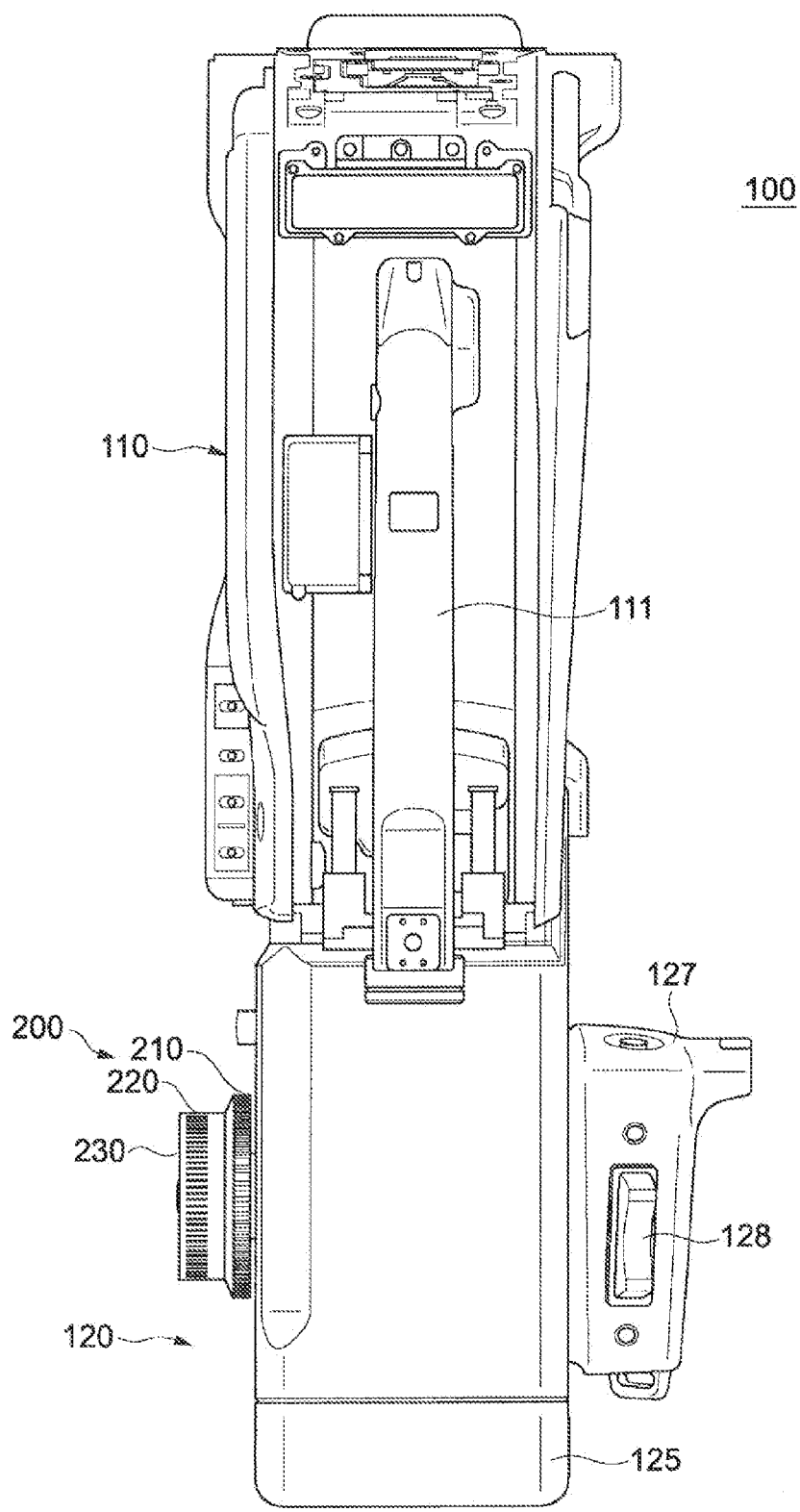
FIG. 3 is a top view of the 3-D image pickup apparatus shown in FIG. 1.
Figure 4:
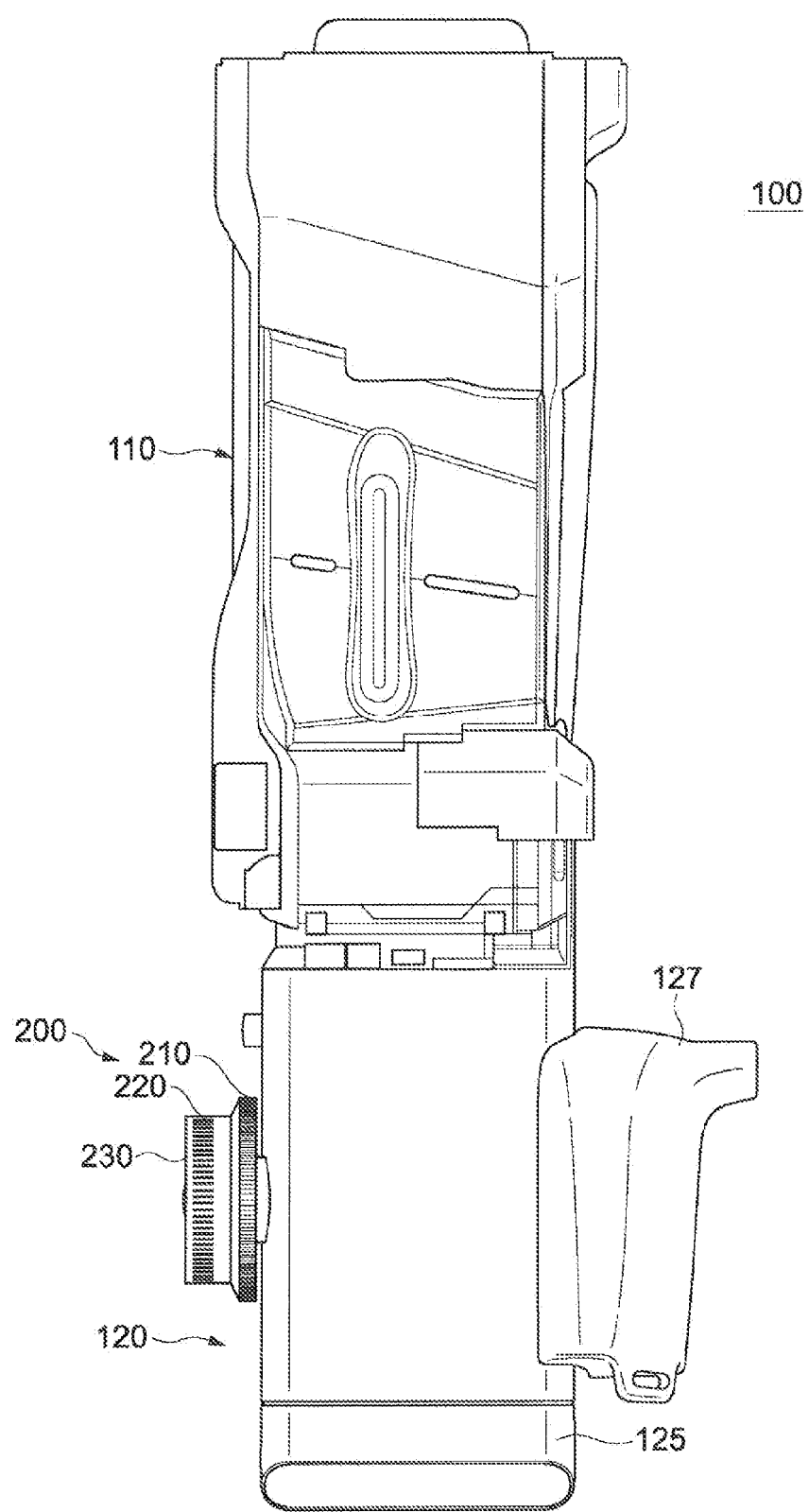
FIG. 4 is a bottom view of the 3-D image pickup apparatus shown in FIG. 1.
Figure 5:
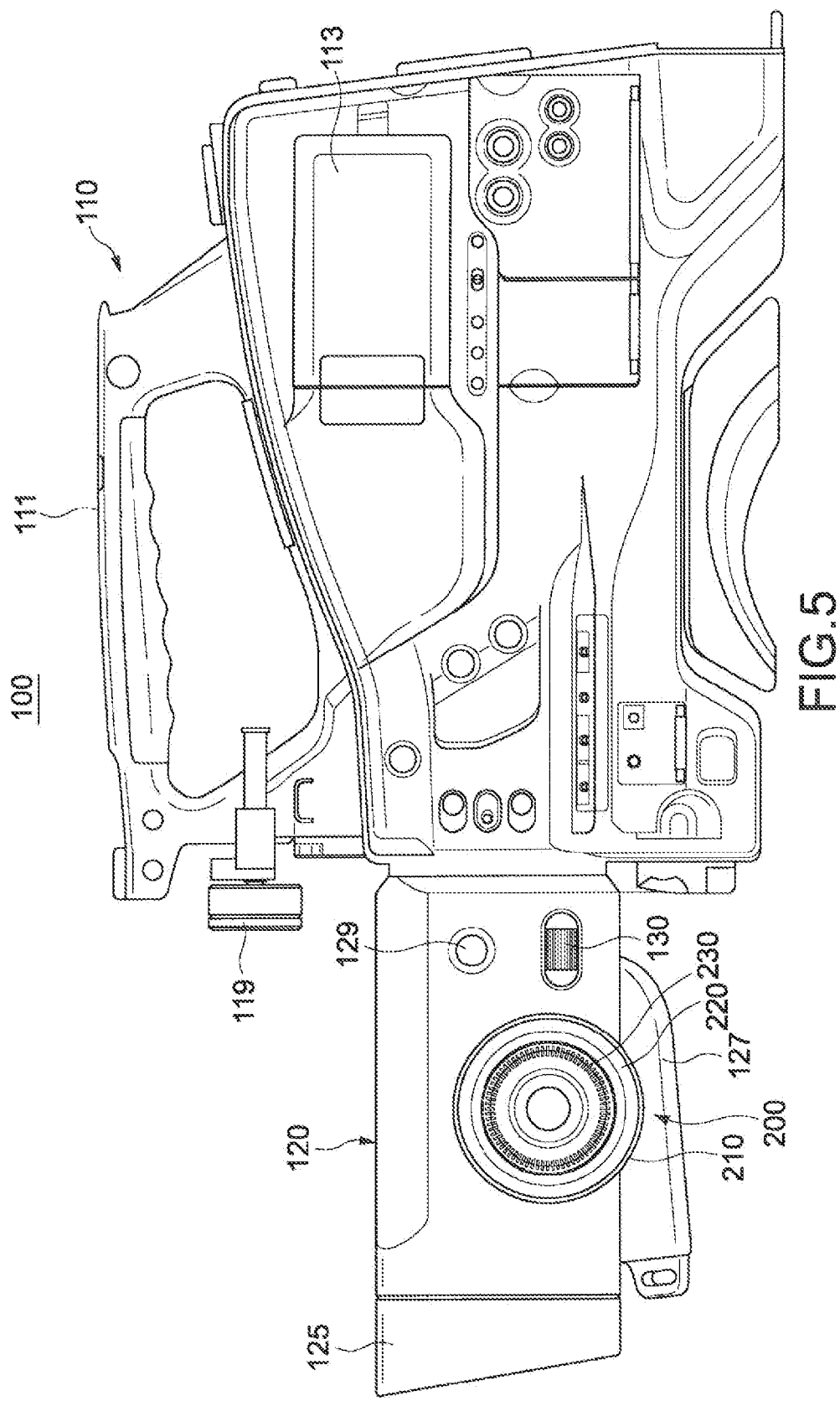
FIG. 5 is a right-side view of the 3-D image pickup apparatus shown in FIG. 1.
Figure 6:
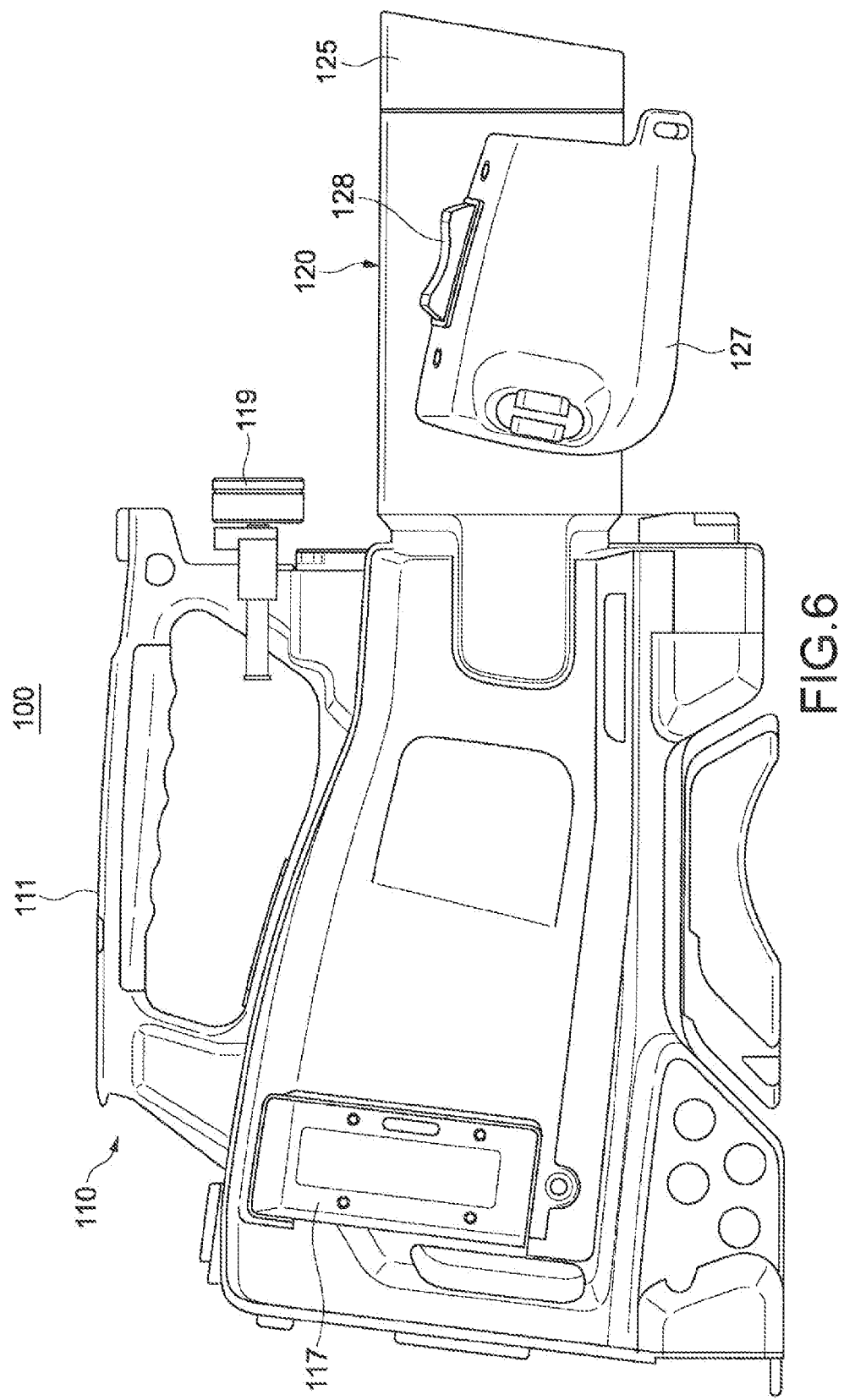
FIG. 6 is a left-side view of the 3-D image pickup apparatus shown in FIG. 1.

FIGS. 1 to 6 are diagrams respectively showing the 3-D image pickup apparatus of this embodiment from six sides. Specifically, FIG. 1 is a front view, FIG. 2 is a back view, FIG. 3 is a top view, FIG. 4 is a bottom view, FIG. 5 is a right-side view, and FIG. 6 is a left-side view.

The 3-D image pickup apparatus 100 includes a main body portion 110 and a lens portion 120.

Provided in the main body portion 110 are an interface group including various interfaces for connecting with an external apparatus, an operation button group including various operation buttons, a handle 111, a display portion 113, a battery adapter 115, a memory card slot 117, and the like. The interface group and the battery adapter 115 are mainly provided on a rear surface of the main body portion 110. As the interface, there are, for example, an input/output of a digital video and digital audio, an input/output of an analog video and analog audio, a control input, a monitor output, and a headphone output. A battery (not shown) can be detached from the battery adapter 115.

A part of the operation button group, the display portion 113, and the memory card slot 117 are mainly provided on a side surface of the main body portion 110. Examples of the operation button include a power button, a recording button, a reproduction button, a fast-forward button, a rewind button, and a shutter button. The display portion 113 is used for displaying, in addition to a video being taken and a recording video, user interfaces for selecting various functions and performing setting operations, and the like, and provided on the side surface of the main body portion 110 while being rotatable in directions about two axes. As the display portion 113, a liquid crystal display, an organic EL (Electro-Luminescence) display, or the like is used. A memory card as a semiconductor recording medium can be detached from the memory card slot 117, and digital video data can be recorded and read out onto/from the memory card.

Other parts of the operation button group and the handle 111 are mainly provided on an upper surface of the main body portion 110. The handle 111 is a portion that a user holds for supporting the 3-D image pickup apparatus 100. A microphone 119 is attached at a front portion of the handle 111.

Further, a control circuit such as a CPU (Central Processing Unit), left- and right-side image pickup devices, a signal processing circuit, an encoder circuit, and the like are incorporated into the main body portion 110.

On the other hand, a right-side lens optical system 121R and a left-side lens optical system 121L are provided in the lens portion 120 in parallel. The right-side lens optical system 121R and the left-side lens optical system 121L are structured so that adjustments of a zoom, focus, and convergence can be carried out in sync.

Moreover, at a tip end portion of the lens portion 120, a lens filter 123 that limits a wavelength of light that enters the right-side lens optical system 121R and the left-side lens optical system 121L and a lens hood 125 that protects pickup lenses of the right-side lens optical system 121R and the left-side lens optical system 121L for various reasons are provided.

On a side surface of the lens portion 120, a grip portion 127 is provided as a portion that is held by a hand of the user. A wide-angle/telescopic switch 128 is provided to the grip portion 127. Furthermore, on the side surface of the lens portion 120, a dimming filter button 129 for adjusting an amount of light that enters the right-side lens optical system 121R and the left-side lens optical system 121L so that it decreases, an iris dial 130 for adjusting brightness of a taken image by an exposure adjustment, an adjustment ring 200, and the like are provided. The adjustment ring 200 is an operation portion that is used for adjusting a zoom, focus, and convergence, the details of which will be described later.

(Structure of Adjustment Ring)

Next, a structure of the adjustment ring 200 will be described.

Figure 7:
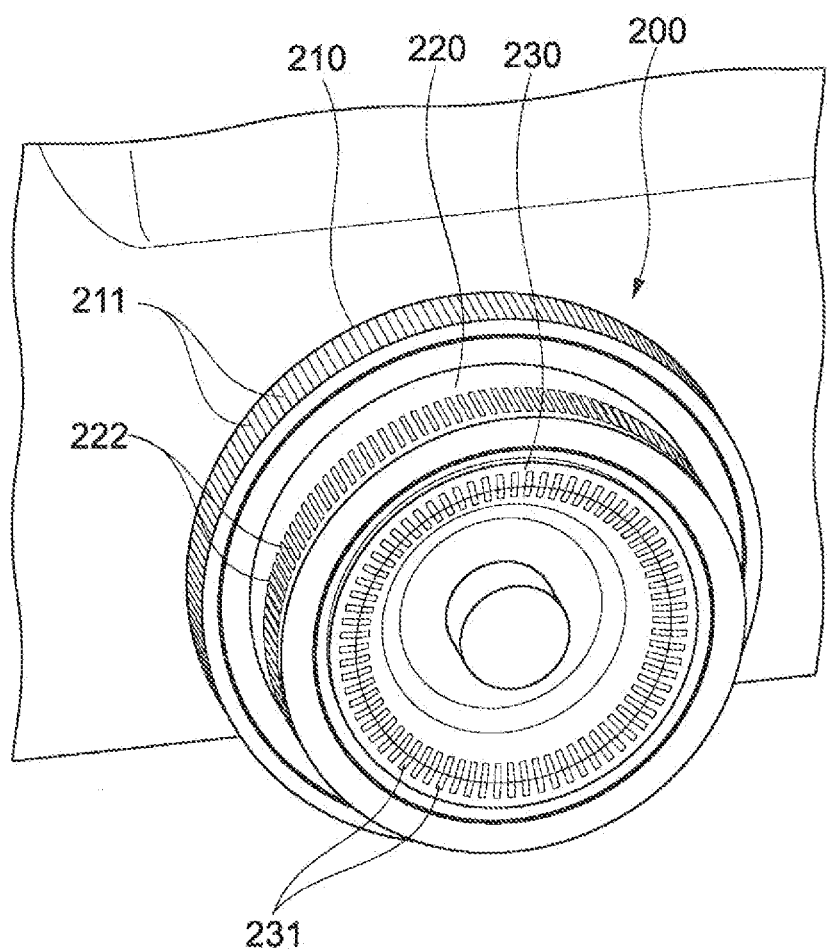
FIG. 7 is a perspective view of an adjustment ring provided in the 3-D image pickup apparatus shown in FIG. 1.
Figure 8:
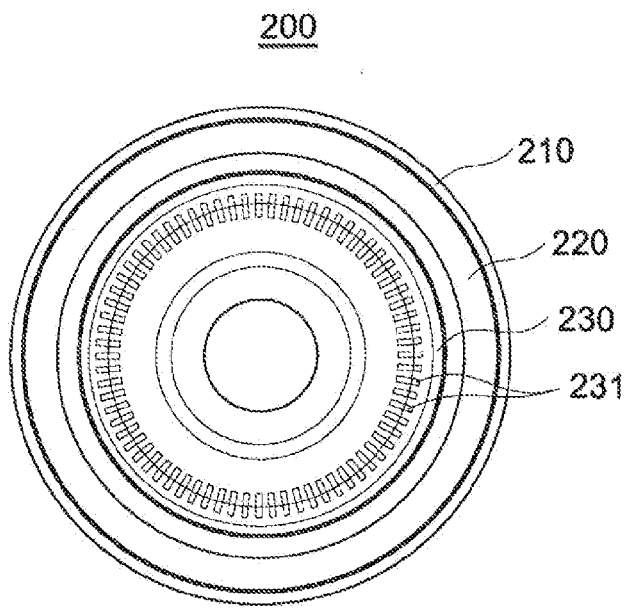
FIG. 8 is a plan view of the adjustment ring provided in the 3-D image pickup apparatus shown in FIG. 1.
Figure 9:
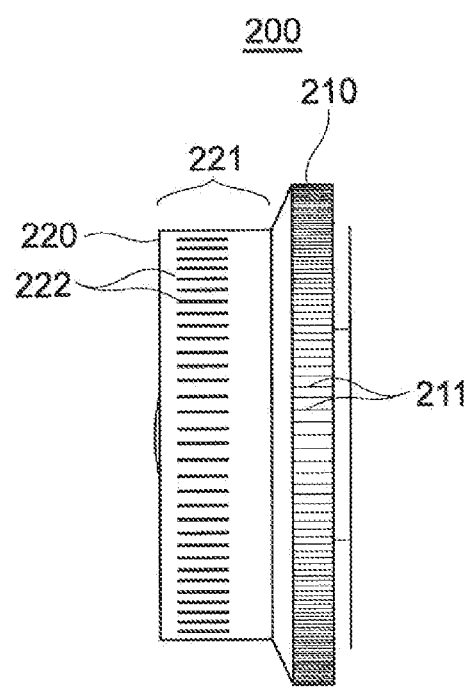
FIG. 9 is a side view of the adjustment ring provided in the 3-D image pickup apparatus shown in FIG. 1.

FIG. 7 is a perspective view of the adjustment ring 200, FIG. 8 is a plan view of the adjustment ring 200, and FIG. 9 is a side view of the adjustment ring 200 shown in FIG. 8.

The adjustment ring 200 is constituted of a zoom ring 210 for a zoom adjustment, a focus ring 220 for a focus adjustment, and a convergence ring 230 for a convergence adjustment. The zoom ring 210, the focus ring 220, and the convergence ring 230 are combined by an embedded structure while being coaxially and independently rotatable in positive and negative directions. More specifically, the zoom ring 210 is a rotary portion that is positioned on an outermost circumferential side of the adjustment ring 200, the focus ring 220 is a rotatable portion on an inner side of the zoom ring 210, and the convergence ring 230 is a rotatable portion that is more on the inner side than the focus ring 220. Therefore, outer diameters of the zoom ring 210, the focus ring 220, and the convergence ring 230 sequentially become smaller in the stated order. As a result, the user can sensuously grasp the adjustment target from the positional relationship of the ring that is being operated and the outer diameter of the ring, which is expected to improve operability.

Slip prevention slits 211 are formed on an outer circumferential surface of the zoom ring 210. Moreover, the focus ring 220 has a portion 221 protruding from the zoom ring 210 in an axial direction (see FIG. 9), and slip prevention slits 222 are formed on an outer circumferential surface of the protruding portion 221. On the other hand, a tip end position of the convergence ring 230 rotatably provided on the inner side of the focus ring 220 matches or almost matches a tip end position of the focus ring 220. The tip end portion of the convergence ring 230 has a concave dome shape, and slip prevention slits 231 are formed on an inner circumferential surface of the concave portion (see FIGS. 7 and 8).

Figure 10:
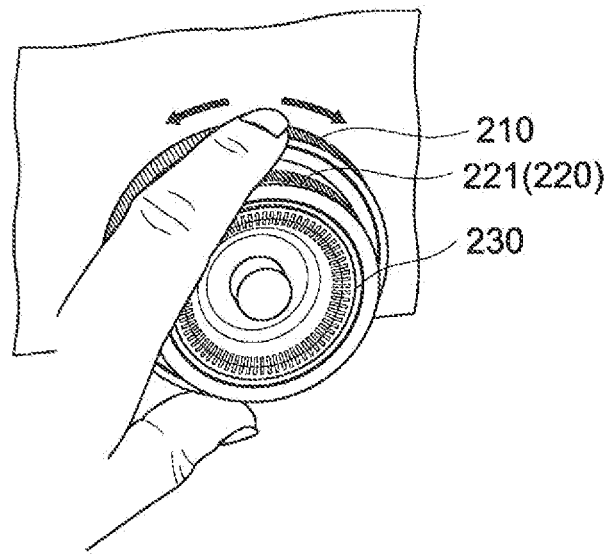
FIG. 10 is a diagram showing an operation of a zoom adjustment of the adjustment ring shown in FIG. 7.
Figure 11:
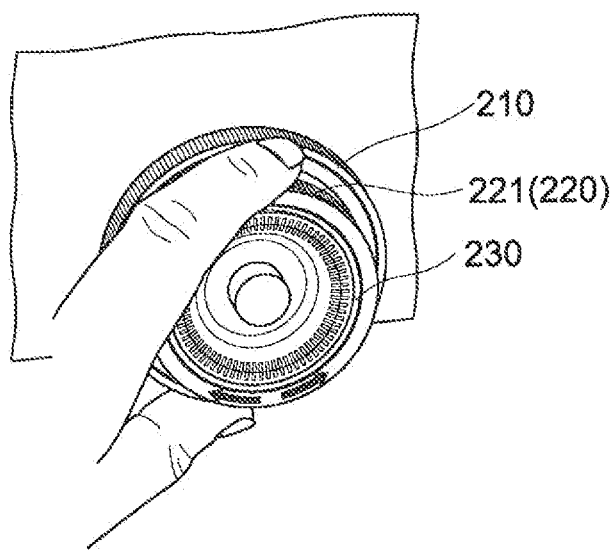
FIG. 11 is a diagram showing an operation of a focus adjustment of the adjustment ring shown in FIG. 7.
Figure 12:
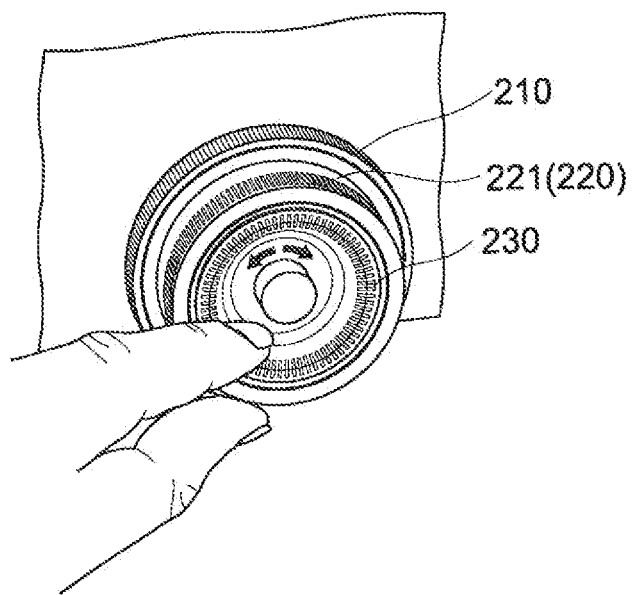
FIG. 12 is a diagram showing an operation of a convergence adjustment of the adjustment ring shown in FIG. 7.

FIGS. 10 to 12 are diagrams showing operations of the adjustment ring 200 having the structure as described above.

FIG. 10 shows an operation for a zoom adjustment. At this time, the user can make a zoom adjustment by placing a finger on the outer circumferential surface of the zoom ring 210 and turning the zoom ring 210. FIG. 11 shows an operation for a focus adjustment. At this time, the user can make a focus adjustment by placing the finger on the outer circumferential surface of the protruding portion 221 of the focus ring 220 and turning the focus ring 220.

FIG. 12 shows an operation for a convergence adjustment. At this time, the user can make a convergence adjustment by placing the finger on the inner circumferential surface of the dome-like concave portion at the tip end portion of the convergence ring 230 and turning the convergence ring 230.

Here, since the zoom ring 210, the focus ring 220, and the convergence ring 230 are combined coaxially and integrated as the adjustment ring 200, the user can smoothly change the adjustment target among the zoom, focus, and convergence just by slightly moving a hand. Moreover, since the zoom ring 210, the focus ring 220, and the convergence ring 230 all rotate coaxially, all operations can be made with the same feeling. Therefore, it becomes possible to swiftly start the adjustment right after the adjustment target is changed. An improvement of efficiency is expected especially in adjustment tasks that require alternate and repetitive adjustments like the focus and convergence adjustments.

(Adjustment Circuits for Zoom, Focus, and Convergence)

Next, adjustment circuits for a zoom, focus, and convergence will be described.

Figure 13:
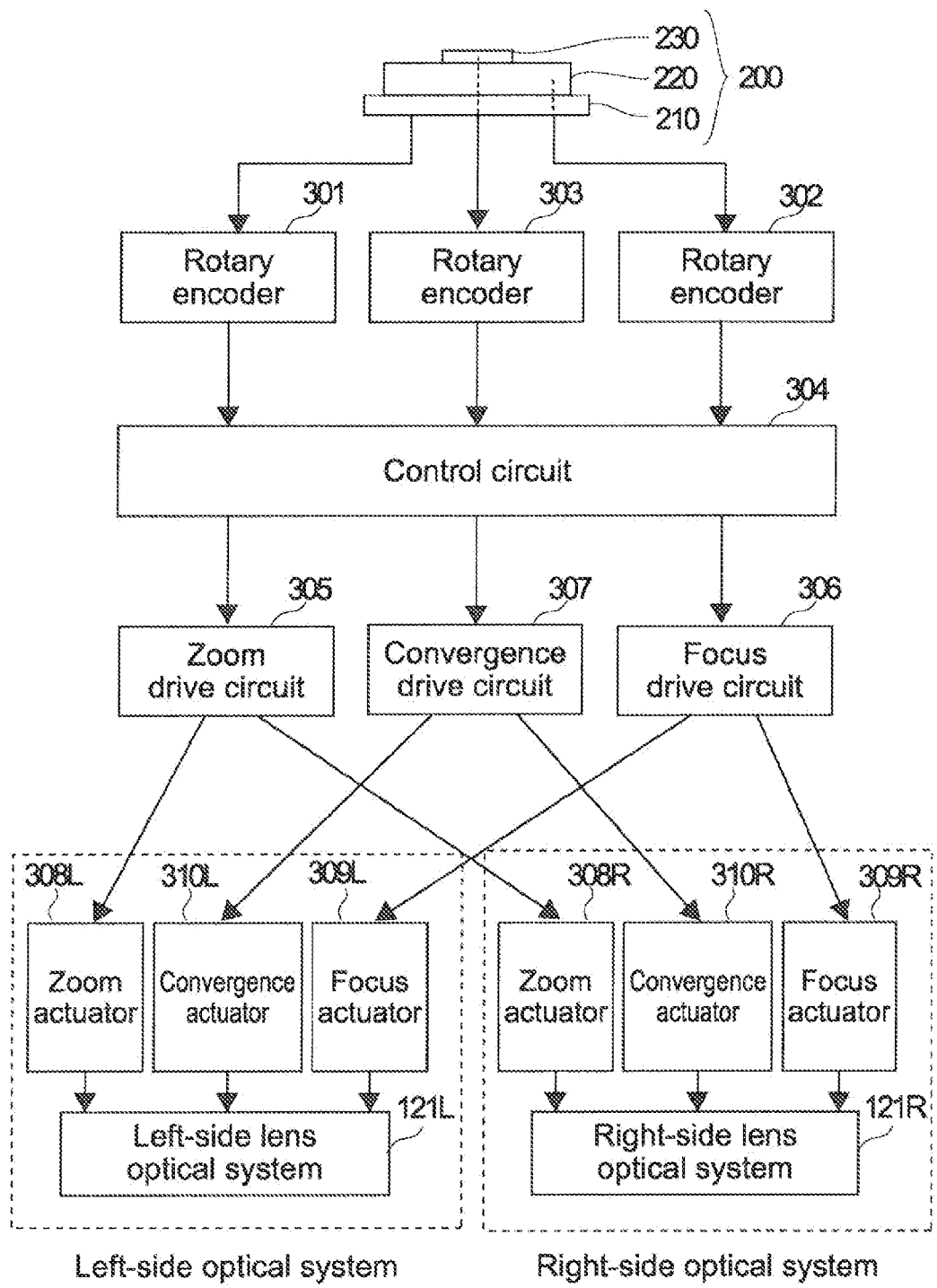
FIG. 13 is a block diagram showing structures of adjustment circuits for a zoom, focus, and convergence.

FIG. 13 is a diagram showing a structure of the adjustment circuits for a zoom, focus, and convergence. As shown in the figure, the 3-D image pickup apparatus 100 of this embodiment includes rotary encoders 301, 302, and 303 respectively corresponding to the zoom ring 210, the focus ring 220, and the convergence ring 230 of the adjustment ring 200, a control circuit 304, a zoom drive circuit 305, a focus drive circuit 306, a convergence drive circuit 307, a left-side optical system zoom actuator 308L, a left-side optical system focus actuator 309L, a left-side optical system convergence actuator 310L, a right-side optical system zoom actuator 308R, a right-side optical system focus actuator 309R, and a right-side optical system convergence actuator 310R.

Rotational information of the zoom ring 210, the focus ring 220, and the convergence ring 230 that are independently rotated in the adjustment ring 200 is detected by the rotary encoders 301, 302, and 303 respectively corresponding to the rings. Detection information of the rotary encoders 301, 302, and 303 is transmitted to the control circuit 304 such as a CPU. The control circuit 304 executes predetermined operational processing related to a zoom adjustment based on the detection information of the rotary encoder 301 corresponding to the zoom adjustment to obtain a control amount, and supplies control information corresponding to the control amount to the zoom drive circuit 305.

The zoom drive circuit 305 drives the left-side optical system zoom actuator 308L and the right-side optical system zoom actuator 308R based on the control information. Accordingly, zoom adjustments of the left-side optical system and the right-side optical system are carried out. Further, the control circuit 304 executes predetermined operational processing related to a focus adjustment based on the detection information of the rotary encoder 302 corresponding to the focus adjustment to obtain a control amount, and supplies control information corresponding to the control amount to the focus drive circuit 306.

The focus drive circuit 306 drives the left-side optical system focus actuator 309L and the right-side optical system focus actuator 309R based on the control information. Accordingly, focus adjustments of the left-side optical system and the right-side optical system are carried out. Further, the control circuit 304 executes predetermined operational processing related to a convergence adjustment based on the detection information of the rotary encoder 303 corresponding to the convergence adjustment to obtain a control amount, and supplies control information corresponding to the control amount to the convergence drive circuit 307. The convergence drive circuit 307 drives the left-side optical system convergence actuator 310L and the right-side optical system convergence actuator 310R based on the control information. Accordingly, convergence adjustments of the left-side optical system and the right-side optical system are carried out.

As described above, according to this embodiment, the zoom ring 210, the focus ring 220, and the convergence ring 230 are combined coaxially and integrated as the adjustment ring 200. With this structure, the user can smoothly change the adjustment target among the zoom, focus; and convergence just by slightly moving a hand. Moreover, since the zoom ring 210, the focus ring 220, and the convergence ring 230 all rotate coaxially, all operations can be made with the same feeling. Therefore, it becomes possible to swiftly start the adjustment right after the adjustment target is changed. An improvement of efficiency is expected especially in adjustment tasks that require alternate and repetitive adjustments like the focus and convergence adjustments. In addition, since a focus adjustment may become necessary by a zoom adjustment in some cases, efficiency of adjustment tasks including the zoom adjustment can be improved in this case.

It should be noted that the embodiment of the present disclosure is not limited to the above embodiment and can be variously changed without departing from the gist of the present disclosure.

For example, in the above embodiment; the zoom ring 210 is positioned on the outermost circumferential side of the adjustment ring 200, the focus ring 220 is positioned on the inner side of the zoom ring 210, and the convergence ring 230 is positioned on the inner side of the focus ring 220 in the structure of the adjustment ring 200. Instead of this structure, it is also possible to position the zoom ring 210 on an innermost circumferential side of the adjustment ring 200 and position the focus ring 220 and the convergence ring 230 on the outer circumference in the stated order or the convergence ring 230 and the focus ring 220 in the stated order.

Moreover, the adjustment ring 200 may be provided at positions other than the side surface of the main body portion 110 as long as it can be easily operated by a user.

Further, although the adjustment ring 200 has a structure in which the focus ring 220 and the convergence ring 230 protrude from the zoom ring 210 in the above embodiment, a structure in which the convergence ring 230 additionally protrudes from the focus ring 220 and slip prevention slits are formed on the outer circumferential surface of the protruding portion of the convergence ring 230 is also possible.

Second Embodiment

Next, a second embodiment of the present disclosure will be described.

Figure 14:
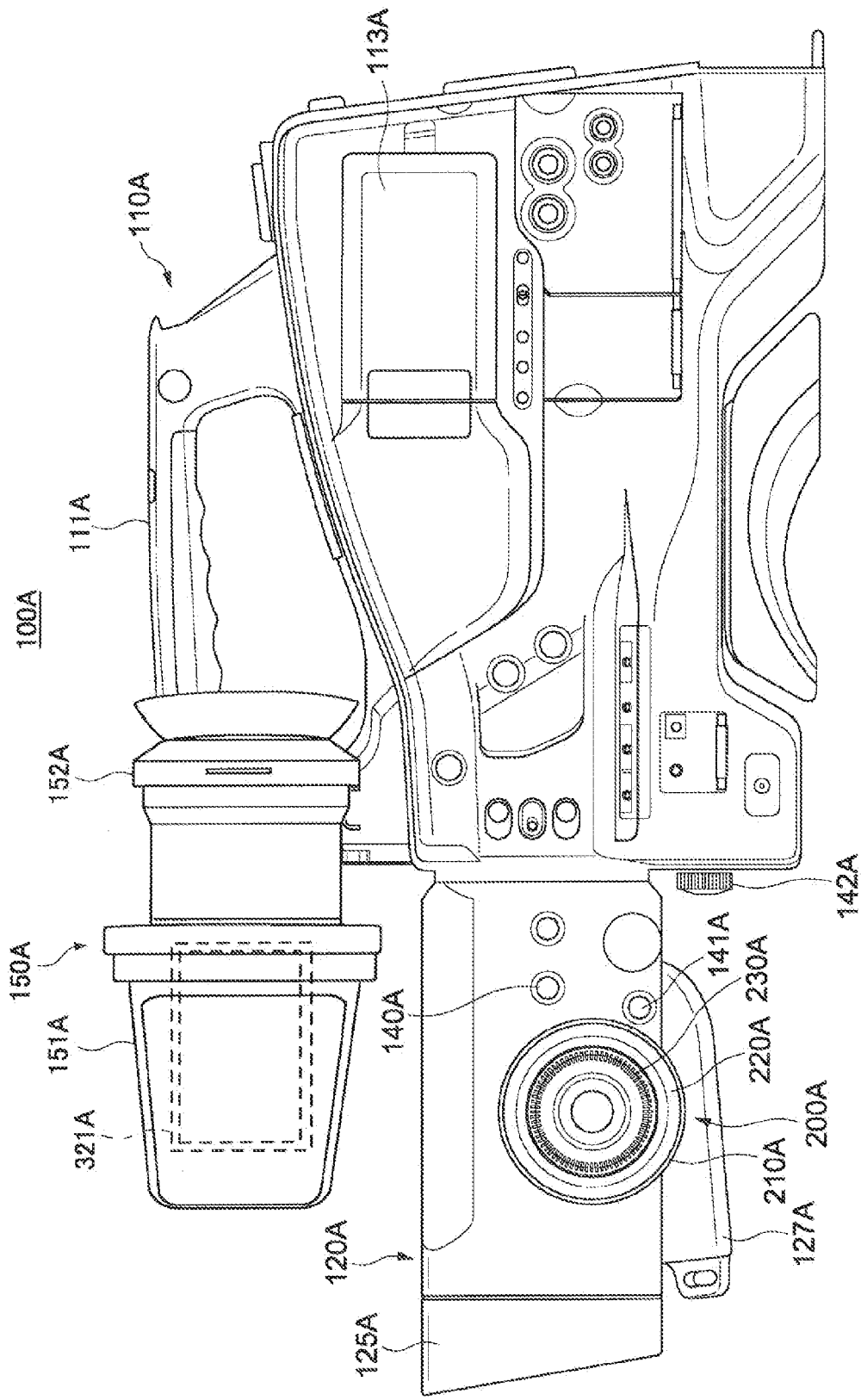
FIG. 14 is a right-side view of a 3-D image pickup apparatus according to a second embodiment of the present disclosure.
Figure 15:
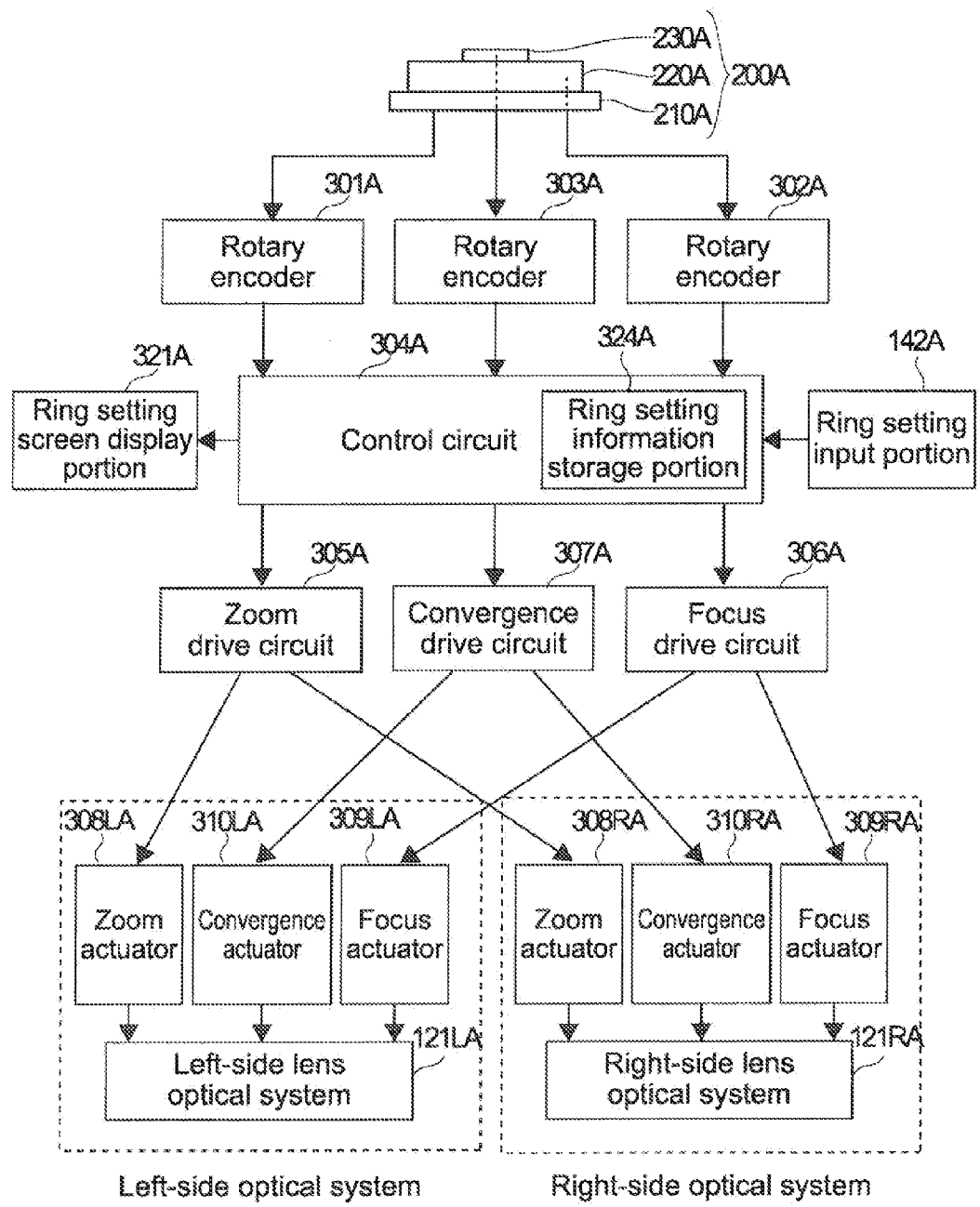
FIG. 15 is a block diagram showing structures of adjustment circuits for a zoom, focus, and convergence in the 3-D image pickup apparatus of the second embodiment.

FIG. 14 is a right-side view of a 3-D image pickup apparatus according to the second embodiment. FIG. 15 is a diagram showing structures of adjustment circuits for a zoom, focus, and convergence of the 3-D image pickup apparatus according to the second embodiment.

It should be noted that in the 3-D image pickup apparatus 100A of the second embodiment shown in the figure, parts that are the same as those of the first embodiment are denoted by symbols that are obtained by adding "A" at trails of the symbols allocated to the same parts of the first embodiment.

The adjustment ring 200 of the 3-D image pickup apparatus 100 of the first embodiment is obtained by combining three rings by an embedded structure, and functions as the zoom ring 210, the focus ring 220, and the convergence ring 230 are fixedly allocated to the three rings sequentially from the outer circumferential side. Further, positive and negative directions of the zoom ring 210, the focus ring 220, and the convergence ring 230 with respect to the rotational direction are also fixed.

However, when the allocation of the functions to the rings and the positive and negative directions with respect to the rotational direction are fixed as described above, an inconvenience that the current allocation does not match an operational feeling may occur depending on a user. Moreover, regarding the relationship between the rotational direction of the rings and the increase and decrease of an adjustment value, the clockwise direction is generally "increase" and the counterclockwise direction is generally "decrease" in Japan. However, the user may prefer the opposite.

In this regard, in the 3-D image pickup apparatus 100A of the second embodiment, three adjustment items of a zoom, focus, and convergence are flexibly allocated to three ring 210A, 220A, and 230A of an adjustment ring 200A. In addition, in the 3-D image pickup apparatus 100A of this embodiment, the relationship between the rotational direction and the increase and decrease of an adjustment value is arbitrarily allocated to each of the rings 210A, 220A, and 230A. In descriptions below, a mechanism for realizing the allocation to the adjustment ring 200A is referred to as "ring setting mechanism". Details of the ring setting mechanism will be given below.

(Ring Setting Mechanism)

In the 3-D image pickup apparatus 100A of the second embodiment, the ring setting mechanism is constituted of a ring setting screen display portion 321A, a ring setting input portion 142A, a control circuit (control portion) 304A, and the like.

Figure 19:
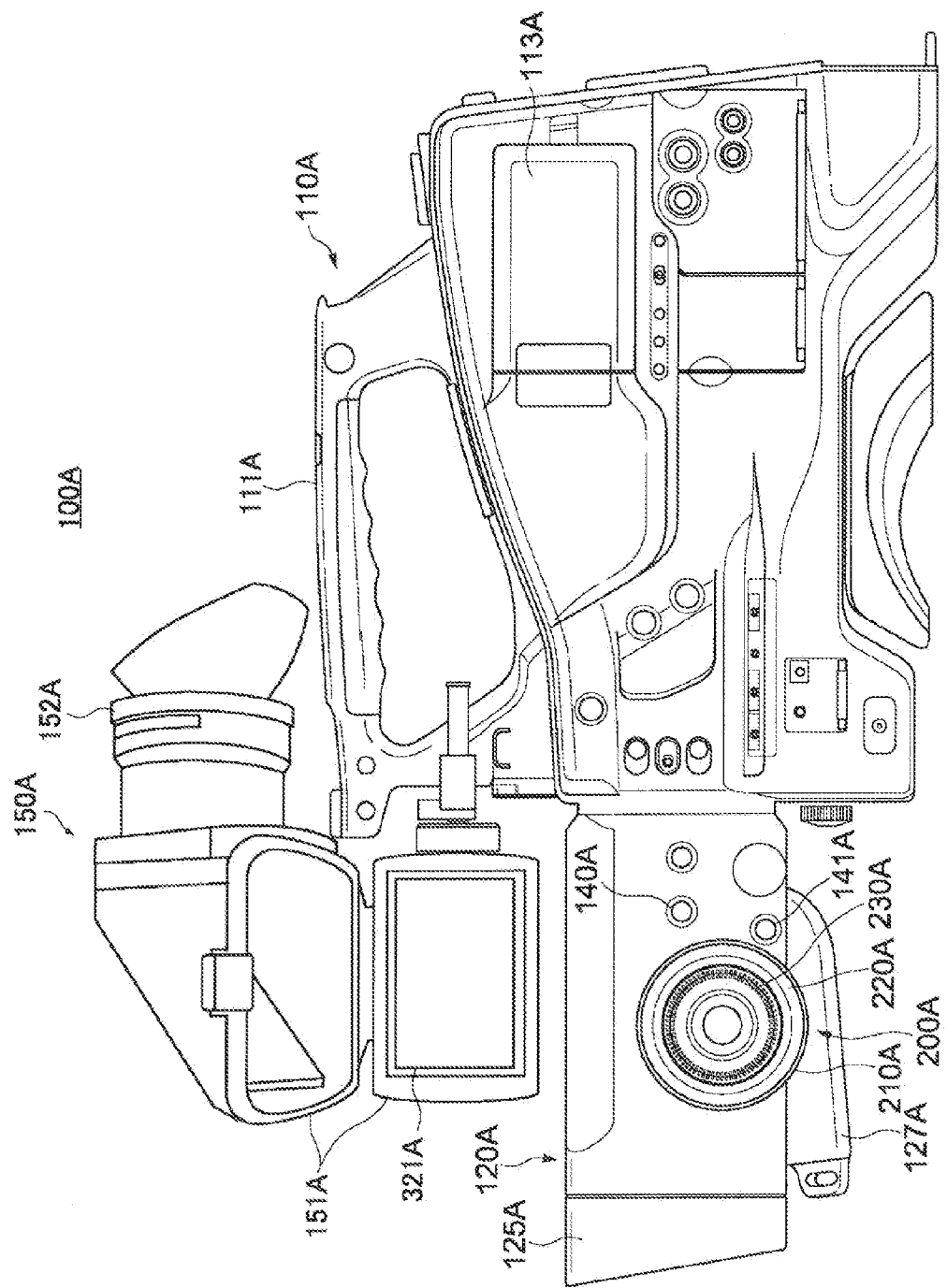
FIG. 19 is a side view showing a state where an eyepiece unit is removed from a display portion in the 3-D image pickup apparatus shown in FIG. 14.

The ring setting screen display portion 321A displays a screen for a ring setting. In this embodiment, a display panel in a view finder 150A is used as the ring setting screen display portion 321A. The view finder 150A is constituted of a display portion 151A that has a built-in display panel such as a liquid crystal display, an eyepiece unit 152A that enlarges a video displayed on the display panel, and the like. Moreover, as shown in FIG. 19, the eyepiece unit 152A can be detached from the display portion 151A, and the user can directly see the video displayed on the display panel by removing the eyepiece unit 152A from the display portion 151A. It should be noted that the ring setting screen may be displayed on a display portion 113A provided in a main body portion 110A.

The ring setting input portion 142A receives inputs of ring setting information from the user for selectively allocating the three adjustment items including a focus adjustment, a convergence adjustment, and a zoom adjustment to the three rings 210A, 220A, and 230A and allocating the relationship between the rotational direction and the increase and decrease of an adjustment value to each of the rings. In this embodiment, a rotary switch or the like provided on the main body portion 110A is used as the ring setting input portion 142A. The rotary switch as the ring setting input portion 142A can be turned and pushed. By the rotational operation of the rotary switch, the setting target item on the ring setting screen is shifted, and a value of the setting target item is switched by the push operation.

The control circuit 304A includes a ring setting information storage portion 324A that stores ring setting information. The control circuit 304A allocates the adjustment items of the focus adjustment, convergence adjustment, and zoom adjustment to the three rings 210A, 220A, and 230A based on the ring setting information stored in the ring setting information storage portion 324A. More specifically, the control circuit 304A switches output destinations of rotary encoders 301A, 302A, and 303A of the three rings 210A, 220A, and 230A, respectively, among a zoom drive circuit 305A, a focus drive circuit 306A, and a convergence drive circuit 307A based on the ring setting information stored in the ring setting information storage portion 324A.

(Ring Setting Operation)

Next, an operation for a ring setting will be described.

FIGS. 16 and 17 are diagrams showing GUIs for a ring setting and display transitions thereof.

First, an initial screen 401 of the ring setting screen is displayed on the ring setting screen display portion 321A by an operation to the operation button provided on the main body portion 110.

The three rings 210A, 220A, and 230A of the adjustment ring 200A are expressed as "outside", "middle", and "inside" in the ring setting screen. Further, in the ring setting screen, an adjustment item area where adjustment item values (zoom, focus, and convergence) are displayed and a positive operation direction item area where values in the positive operation direction in which adjustment values increase (clockwise, counterclockwise) are displayed are set for each of the three rings 210A (outside), 220A (middle), and 230A (inside).

The adjustment items and positive operation direction items allocated to the three current rings 210A (outside), 220A (middle), and 230A (inside) are assumed to be as follows, for example (401 of FIG. 16).

Ring 210A (outside): adjustment item=zoom, positive operation direction item=clockwise Ring 220A (middle): adjustment item=focus, positive operation direction item=clockwise Ring 230A (inside): adjustment item=convergence, positive operation direction item=clockwise Now, assume a case where the existing ring setting is changed as follows (FIG. 17).

Ring 210A (outside): adjustment item=zoom, positive operation direction item=clockwise Ring 220A (middle): adjustment item=convergence (change), positive operation direction item=counterclockwise (change)

Ring 230A (inside): adjustment item=focus (change), positive operation direction item=counterclockwise (change)

In the initial screen 401 of the ring setting screen, to enable the user to visually grasp that the adjustment item of the ring 210A (outside) is the current target item, the adjustment item display area of the ring 210A (outside) is in a distinguishable state using, for example, inversion display.

Since the adjustment item and positive operation direction item of the ring 210A (outside) are not changed, the user performs an operation of turning the ring setting input portion 142A in the initial screen 401 of the ring setting screen. When the control circuit 304A judges that the ring setting input portion 142A has been turned a predetermined amount or more, the control circuit 304A shifts the target item to the next item. Here, the target item is shifted in the order of the adjustment item of the ring 210A (outside) the positive operation direction item of the ring 210A (outside)→the adjustment item of the ring 220A (middle)→the positive operation direction item of the ring 220A (middle)→the adjustment item of the ring 230A (inside)→the positive operation direction item of the ring 230A (inside) when the ring setting input portion 142A is turned in a first direction. When the ring setting input portion 142A is turned in a second direction opposite to the first direction, the direction of the shift of the target items also becomes opposite.

Here, assuming a case where the ring setting input portion 142A is turned in the first direction, the control circuit 304A shifts the target item to the positive operation direction item of the ring 210A (outside) (ring setting screen 402 of FIG. 16).

Subsequently, by the user turning the ring setting input portion 142A in the first direction, the control circuit 304A shifts the target item to the adjustment item area of the ring 220A (middle) (ring setting screen 403 of FIG. 16). Then, the user pushes the ring setting input portion 142A once. In this ring setting example, a part of the purpose is to allocate the adjustment item of the ring 220A (middle) to "convergence". Moreover, the adjustment target is changed in the order of "focus"→"convergence"→"zoom"→"focus" every time the ring setting input portion 142A is pushed once. Accordingly, when the ring setting input portion 142A is pushed once, the adjustment item of the ring 220A (middle) is changed from "focus" to "convergence" (ring setting screen 404 of FIG. 17).

Further, in this ring setting example, another purpose is to switch the positive operation direction of the adjustment item of the ring 220A (middle) to the "counterclockwise" direction. In this regard, by the user turning the ring setting input portion 142A in the first direction, the target item is moved to the next positive operation direction item of the ring 220A (middle) (ring setting screen 405 of FIG. 17). After that, the ring setting input portion 142A is pushed once. As a result, the positive operation direction of the adjustment item of the ring 220A (middle) is changed to the "counterclockwise" direction from the "clockwise" direction (ring setting screen 406 of FIG. 17).

Figure 18:
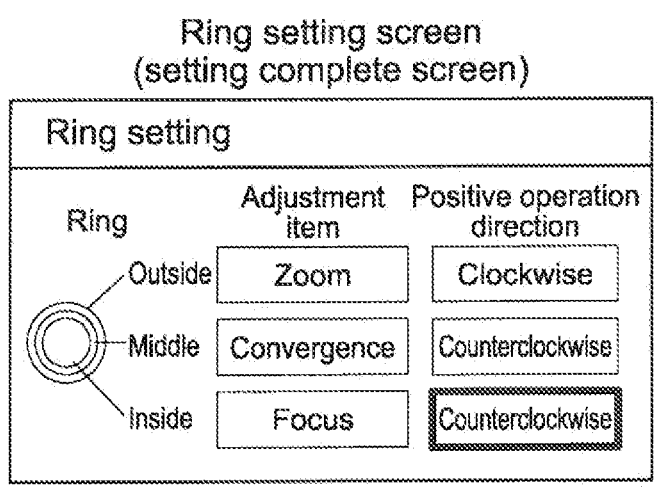
FIG. 18 is a diagram showing a ring setting screen displayed at a time a ring setting is ended.

Similarly, the user changes the ring setting screen to the state shown in FIG. 18 by turning and pushing the ring setting input portion 142A. After that, by closing the ring setting screen or changing it to another screen by an operation to the operation button provided on the main body portion 110, the control circuit 304A overwrites the ring setting information in the ring setting information storage portion 324A. By the processing described above, the ring setting (change) is ended. After that, the changed ring setting is reflected on the operations of the rings 210A, 220A, and 230A.

As described above, according to this embodiment, the three adjustment items of a zoom, focus, and convergence can be flexibly allocated to the three rings 210A, 220A, and 230A of the adjustment ring 200A. Further, according to this embodiment, the relationship between the rotational direction and the increase and decrease of an adjustment value can be set arbitrarily for each of the rings 210A, 220A, and 230A. As a result, an adjustment ring 200A that can be favorably operated by various users can be provided.

(Regarding Lens Adjustment Mode)

In the 3-D image pickup apparatus, it is difficult to take a 3-D video favorably if lateral and longitudinal positions of left- and right-side lenses (right-side lens optical system 121R and left-side lens optical system 121L) are not correct at the time the video is taken. However, the positions may move when an impact or the like is applied to the left- and right-side lenses. In this regard, in the 3-D image pickup apparatus, a mechanism capable of separately adjusting the positions of the left- and right-side lenses is provided. The lens adjustment is made by operating the switch provided on the main body portion 110A to put the mode to a lens adjustment mode and, operating the rings of the adjustment ring 200A while looking at a lens adjustment screen displayed on the display panel of the view finder 150A. It should be noted that when the mode is put to the lens adjustment mode, movement directions (lateral and longitudinal directions) of the lenses are automatically allocated to the rings 210A, 220A, and 230A of the adjustment ring 200A, and information thereof is displayed on the lens adjustment screen.

However, when the switch for putting the mode to the lens adjustment mode is provided on the main body portion 110A, there is a fear that a user may inadvertently press the switch to switch the mode to the lens adjustment mode. When the mode is put to the lens adjustment mode without the user knowing it while a video is being taken, unnecessary lens adjustments may be performed by operations of the adjustment ring 200A for a focus adjustment, zoom adjustment, and the like, with the result that the lens positions may be messed up.

In this regard, the 3-D image pickup apparatus 100A is put to the lens adjustment mode when a lens adjustment button 140A and a shift button 141A provided at a position that can be reached with a finger of one hand operating the lens adjustment button 140A shown in FIG. 14 are pressed at the same time. It should be noted that it is also important for the lens adjustment button 140A and the shift button 141A to be provided apart from each other so that the buttons are not pressed by the same finger at the same time.

Although the mode is put to the lens adjustment mode when the lens adjustment button 140A and the shift button 141A are pressed at the same time as described above, other combinations of two buttons may also be adopted. Accordingly, it is possible to prevent the user from erroneously pressing the switch to put the mode to the lens adjustment mode.

Modified Example

Figure 20:
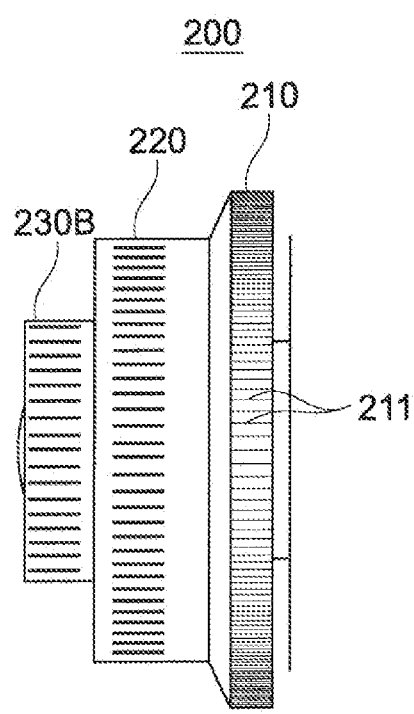
FIG. 20 is a side view showing a modified example of the adjustment ring.

In the above embodiments, the innermost circumferential ring 230 (230A) of the adjustment ring 200 (200A) has been a dome-like concave portion. However, an innermost circumferential ring 230B may protrude as shown in FIG. 20.

The present disclosure contains subject matter related to that disclosed in Japanese Priority Patent Application JP 2010-201942 filed in the Japan Patent Office on Sep. 9, 2010, and Japanese Priority Patent Application JP 2011-071825 filed in the Japan Patent Office on Mar. 29, 2011, the entire content of which is hereby incorporated by reference.

In the above embodiments, actuators used to adjust zoom, focus, and convergence of respective optical systems may be of any available type known to a person of ordinary skill in the art, such as a voice coil motor, a piezoelectric motor, a stepper motor, or the like.

Although exemplary implementations of the present disclosure have been made to a two-lens 3-D image pickup apparatus, the present disclosure may also be implemented in a single-lens 3-D image pickup apparatus. It is also noted that the present disclosure may also be implemented in any image pickup apparatus that requires adjustment of zoom, focus, and convergence of its optical system.

It should be understood by those skilled in the art that various modifications, combinations, sub-combinations and alterations may occur depending on design requirements and other factors insofar as they are within the scope of the appended claims or the equivalents thereof.

What is claimed is:
1. A 3-D image pickup apparatus comprising:
a lens portion that includes a lens system; and
an adjustment ring portion that includes plural coaxially rotatable rings, each adjusting a respective one of plural optical parameters of the lens system, wherein the adjustment ring portion includes three rings: an outermost ring positioned on an outermost circumferential side of the adjustment ring portion, a middle ring positioned at an inner side of the outermost ring, and an innermost ring positioned at an inner side of the middle ring;

wherein a respective one of the three rings are set to adjust zoom, focus, and convergence of the lens system;

wherein the outermost ring has a first protruding portion protruding from a surface of the 3-D image pickup apparatus, and the middle ring has a second protruding portion protruding from the outermost ring in an axial direction;

wherein a first and a second slip prevention portion are formed on a circumferential surface of the first protruding portion and the second protruding portion, respectively; and wherein a tip end position of the innermost ring is positioned substantially co-planar with a tip end position of the middle ring, wherein the tip end position of the innermost ring has a concave portion having a concave dome shape, and wherein a slip prevention portion is formed on an inner circumferential surface of the concave portion.

2. The 3-D image pickup apparatus according to claim 1, wherein the innermost ring has a third protruding portion protruding from the middle ring in an axial direction, and wherein a third slip prevention portion is formed on an outer circumferential surface of the third protruding portion.

3. The 3-D image pickup apparatus according to claim 1, wherein a ring setting of a respective ring of the plural rings is adjustable by a user.

4. A 3-D image pickup apparatus comprising:
a lens portion that includes a lens system;
an adjustment ring portion that includes plural coaxially rotatable rings, each adjusting a respective one of plural optical parameters of the lens system; and
a push and dial selector operable by a user to adjust the ring settings of the plural rings,
wherein a ring setting of a respective ring of the plural rings is adjustable by a user.

5. The 3-D image pickup apparatus according to claim 4, wherein the ring setting includes a first ring setting that sets a correspondence between the respective ring and functions to adjust zoom, focus, and convergence, and wherein the ring setting further includes a second ring setting that sets a rotatable direction of the respective ring in a positive manner.

6. The 3-D image pickup apparatus according to claim 4, further comprising:
a display portion that displays ring settings of the plural rings.

7. The 3-D image pickup apparatus according to claim 4, further comprising:
rotary encoders that detect rotary information associated with the respective rings;
drive circuits associated with respective functions to adjust the optical parameters; and
a control circuit that generates control information in response to rotary information from the rotary encoders and allocates the control information to the drive circuits in accordance with the ring settings of the plural rings.

8. A lens apparatus comprising:
a lens system; and
an adjustment ring portion that includes plural coaxially rotatable rings, each adjusting a respective one of plural optical parameters of the lens system,
wherein the adjustment ring portion includes three rings: an outermost ring positioned on an outermost circumferential side of the adjustment ring portion, a middle ring positioned at an inner side of the outermost ring, and an innermost ring positioned at an inner side of the middle ring;
wherein respective ones of the three rings are set to adjust zoom, focus, and convergence of the lens system;
wherein the outermost ring has a first protruding portion protruding from a surface of the lens apparatus, and the middle ring has a second protruding portion protruding from the outermost ring in an axial direction;
wherein a first and a second slip prevention portion are formed on a circumferential surface of the first protruding portion and the second protruding portion, respectively; and
wherein a tip end position of the innermost ring is positioned substantially co-planar with a tip end position of the middle ring, wherein the tip end position of the innermost ring has a concave portion having a concave dome shape, and wherein a slip prevention portion is formed on an inner circumferential surface of the concave portion.

9. The lens apparatus according to claim 8, wherein the innermost ring has a third protruding portion protruding from the middle ring in an axial direction, and wherein a third slip prevention portion is formed on an outer circumferential surface of the third protruding portion.

10. The lens apparatus according to claim 8, wherein a ring setting of a respective ring of the plural rings is adjustable by a user.

11. A lens apparatus comprising:
a lens system;
an adjustment ring portion that includes plural coaxially rotatable rings, each adjusting a respective one of plural optical parameters of the lens system; and
a push and dial selector operable by a user to adjust the ring settings of the plural rings,
wherein a ring setting of a respective ring of the plural rings is adjustable by a user.

12. The lens apparatus according to claim 11, wherein the ring setting includes a first ring setting that sets a correspondence between the respective ring and functions to adjust zoom, focus, and convergence, and wherein the ring setting further includes a second ring setting that sets a rotatable direction of the respective ring in a positive manner.

13. The lens apparatus according to claim 11, further comprising:
rotary encoders that detect rotary information associated with the respective rings;
drive circuits associated with respective functions to adjust the optical parameters; and
a control circuit that generates control information in response to rotary information from the rotary encoders and allocates the control information to the drive circuits in accordance with the ring settings of the plural rings.

* * * * *